(12) United States Patent
Gayle

(10) Patent No.: US 12,394,984 B1
(45) Date of Patent: Aug. 19, 2025

(54) SEQUENTIAL MULTI-STAGES BATTERY CONTROLLER

(71) Applicant: Charles Hugh Gayle, Charlotte, NC (US)

(72) Inventor: Charles Hugh Gayle, Charlotte, NC (US)

( * ) Notice: Subject to any disclaimer, the term of this patent is extended or adjusted under 35 U.S.C. 154(b) by 24 days.

(21) Appl. No.: 18/445,724

(22) Filed: Jan. 2, 2024

(51) Int. Cl.
*H02J 3/28* (2006.01)
*H02J 7/00* (2006.01)

(52) U.S. Cl.
CPC ............ *H02J 3/28* (2013.01); *H02J 7/00032* (2020.01); *H02J 7/0025* (2020.01); *H02J 7/0047* (2013.01); *H02J 7/00712* (2020.01)

(58) Field of Classification Search
CPC ...... H02J 3/28; H02J 7/00032; H02J 7/00712; H02J 7/0025; H02J 7/0047
See application file for complete search history.

(56) References Cited

U.S. PATENT DOCUMENTS

2024/0039302 A1\* 2/2024 Hwang ............... H02J 7/00032

\* cited by examiner

*Primary Examiner* — Carlos Amaya
(74) *Attorney, Agent, or Firm* — Ashley D. Johnson; Dogwood Patent and Trademark Law

(57) ABSTRACT

A controller that consist of multiple-stages that uses sequential order to supply Power to a grid, while using said sequential order, to also maintain a charge on multiple battery or batteries in multiple stages.

19 Claims, 7 Drawing Sheets

SEQUENTIAL MULTI-STAGES BATTERY CONTROLLER

FIELD OF THE INVENTION

The present invention relates to a controller, and more specifically, a controller that uses sequential order to select a Battery Pod from a Pod of Batteries, thus supplying voltage to an output grid. This sequential order, also, ensures the remaining batteries, in other battery Pods, are in a charge or standby mode, to be selected in a sequential order at an appropriate time.

SUMMARY OF THE INVENTION

The current invention has a minimum of three Battery Pod Stages, as illustrated on FIG. 1.

The Processing Stage working in conjunction with the sequential order, on said Figure determines which Battery Pod to activate, and which to deactivate. This same Processing Stage also determines which Battery Pods to Charge and which to deactivate from the charger.

DETAILED DESCRIPTION

The present invention relates to a Sequential Multistage Battery Controller which has a minimum of three stages, and a maximum of thousands; based on operational demands. During operation, Battery Pod-1 supplies power to an output grid, which is used to power a variety of electrical appliances. However, Battery Pod-2 and Battery Pod-3 are enabled to receive a charging and maintenance voltage.

As Battery Pod-1 monitoring circuit senses a low voltage on the grid, the Processing Stage commences several operations. First, the Processing Stage disables Pod-1 from the output grid. Second, it activates the charging voltage to said Pod-1. Third, it disables the charger from Battery Pod-2, and finally it activates the output voltage from Battery Pod-2 to the output grid. This configuration then goes into hold mode, with Battery Pod-1 in charging mode, Battery Pod-2 in supply mode and Battery Pod 3 still in charging mode.

As the controller continues in operation, the Processing Stage again would sense the low voltage on Battery Pod-2. This would cause the Processor to disable Battery Pod-2, enabling Battery Pod-3 to supply voltage to the grid, and finally enables the charger to supply voltage to Battery Pod-2. With this new configuration setting, the unit then holds and monitors, until it receives a new command.

With Battery Pod-3 in continuous supply mode, the sensing stage would eventually generate a Low voltage command. This command is used to Reactivate Battery Pod-1 to supply voltage to the output grid. Second, it deactivates the charger on Battery Pod-1. Third, it activates the charger on Battery pod-3. It also ensures Battery Pod-2 and Battery Pod-3 are still in charge mode by delaying and completing any command for a time of twenty to thirty minutes. This delay ensures Battery pod-1 is in supply mode while Battery pod-2 and Pod-3 are in charge mode. The delay ensures that these batteries are charged above the Processing Stage low voltage sensing point. After the time has expired, the activation command would be terminated and the unit stays in this new configuration, waiting again for a new command from Battery Pod-1 to go through a new cycle of operation. It should be noted, if there are additional Battery-pods, above three Pods, the described three Pods configuration, the above described operation would continue until all the Pods are depleted, then the restarting command would commence.

The benefit of more than three Battery-pods is the ability to operate over an extended time period, more Battery-pods, longer run time and fully charged battery-pods.

Figure 1:
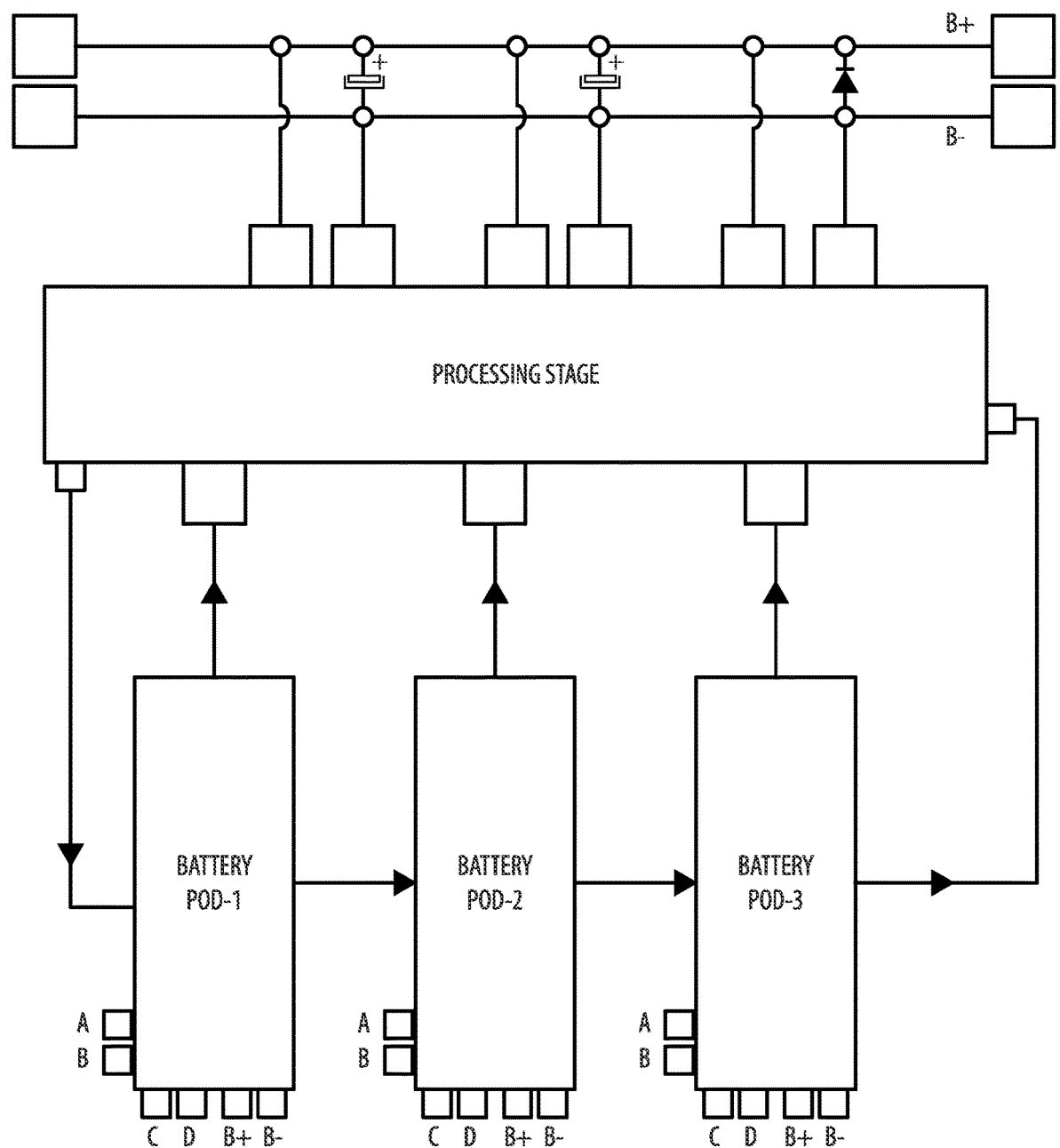
FIG. 1: Illustrates the configuration of the diagram, along with the connection points, on each Battery-Pods.

FIG. 1 Shows the Battery-pods connection to the Processing Stage. The Letters on each Pods are the connection points for the lithium batteries. The Letters A and B would be the charger input connection terminal, C and D would be the output charger terminal, and finally the B+ and B− are the batteries positive and negative connection point.

The condensers C-1 and C-2 are stabilization components, and are used to stabilize, based on the equipment being powered. In some instances, additional condensers may be appropriate. This figure also illustrates the direction the Charge, Discharge, Enable, and Disable commands commence. The arrows indicate the direction of the commands. At the end of a discharge, Battery pod-1 would pass a enable command to Battery pod-2. At the end of Battery-pod-2 discharge, it would then pass an enable command to Battery pod-3, and at the end of Battery-pod-3 discharge, it would return the command to Battery pod-1 and the process would repeat. For the unit to continue in full automatic, all the input connections (must) be engaged. Therefore, all batteries and chargers must be connected for the controller to be fully automatic. If there is no input charger voltage, the controller is considered semi-automatic because at the end of one cycle, the controller would disable, due to the lack of charge, in the Battery Pods.

Figure 2:
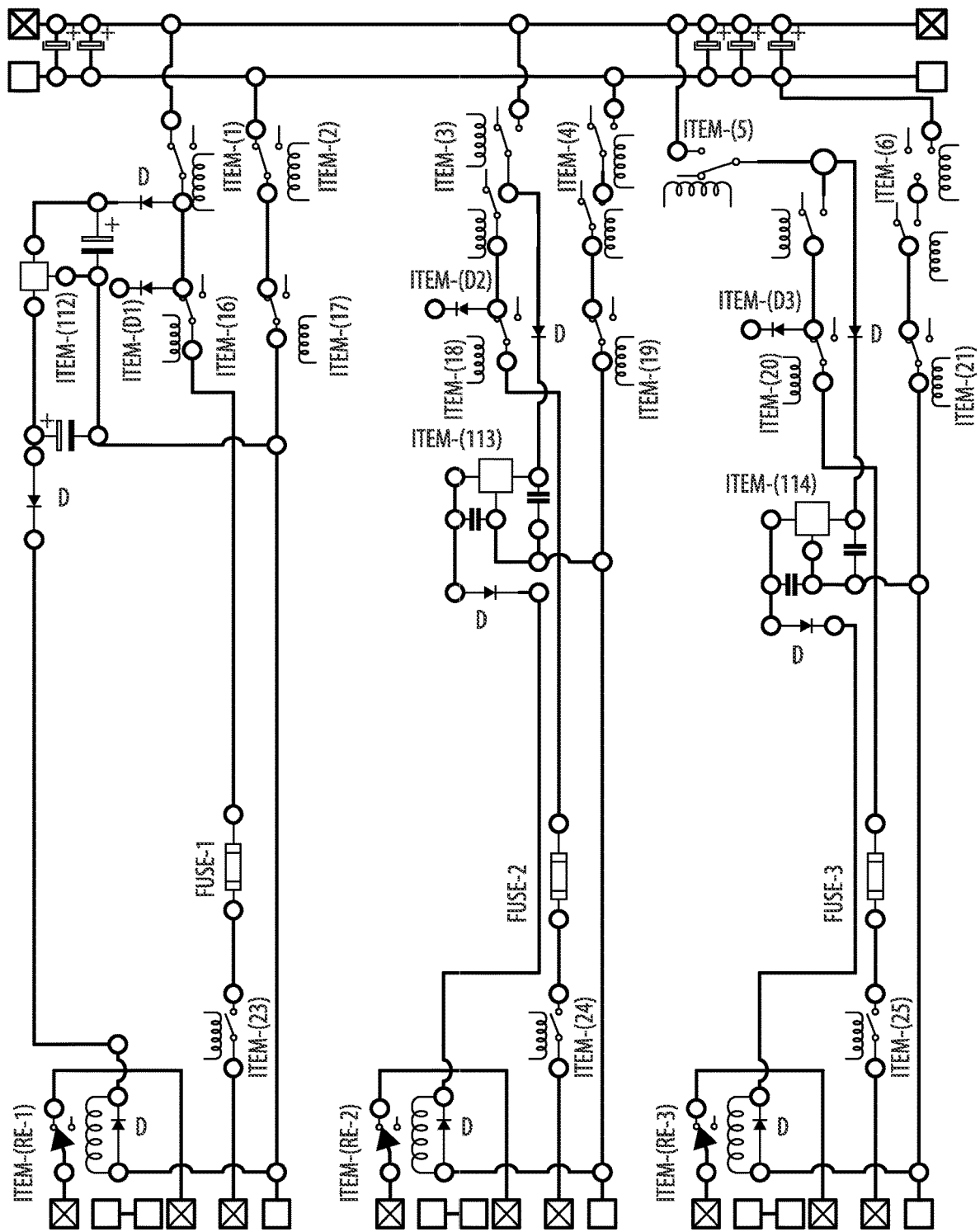
FIG. 2: Illustrates the continuation of the diagram configuration.

FIG. 2 Diagram Illustrates a brief mock-up of the full circuitry. ITEM-(RE-1), ITEM-(RE-2) and ITEM-(RE-3) are relays used to control the charging procedures. These components should be rated base on controller design and amperage requirements, they can be replaced using Silicon Rectifiers (SCR) or other Transistor type, using a small controller circuit, to enable the SCR and the Transistor. This circuitry is not shown.

The inline Fuses, Fuse-1, Fuse-2, and Fuse-3 are also rated base on amperage requirements. Regulator ITEM-(112), ITEM-(113), and ITEM-(114) are used to regulate the voltage for the charger controller relays. Notice where these components are connected in the circuitry. These Regulators are determined based on the charger relay voltage and amperage requirements.

Item-(1), (2), (3), (4), (5), (6), (16), (17), (18), (19), (20), (21), RE-(3) are the major controller relays used in a Dual role in the circuitry. First, they are used to activate and deactivate the unit. Secondly, the processing stage uses few of these relays to manipulate the controller. Example, ITEM- (1) through ITEM-(6), are used to output voltage to a grid, however, the Processing stage also uses these relays in a voltage blocking configuration. Each time a POD is deactivated, the output relay of that pod is also deactivated, to prevent voltage feedback. Also, ITEM-16), (18), and (20) which are relays, in conjunction with other components, such as zener diodes, transistor, resistor, diode, regulators forms a complex high and low sensing stage. It enables the Processing stage, to determine the state of charge in each Battery-pods. When any of these relays are closed, the Processor only senses high voltage, however, when any are open it senses only low voltage. The Processor stage then uses this information to determine when to activate or deactivate any of the relays to change a configuration from supplying voltage to a grid, to charging a battery-pod. These relays are chosen base on the battery voltage and amperage requirement.

Figure 3:
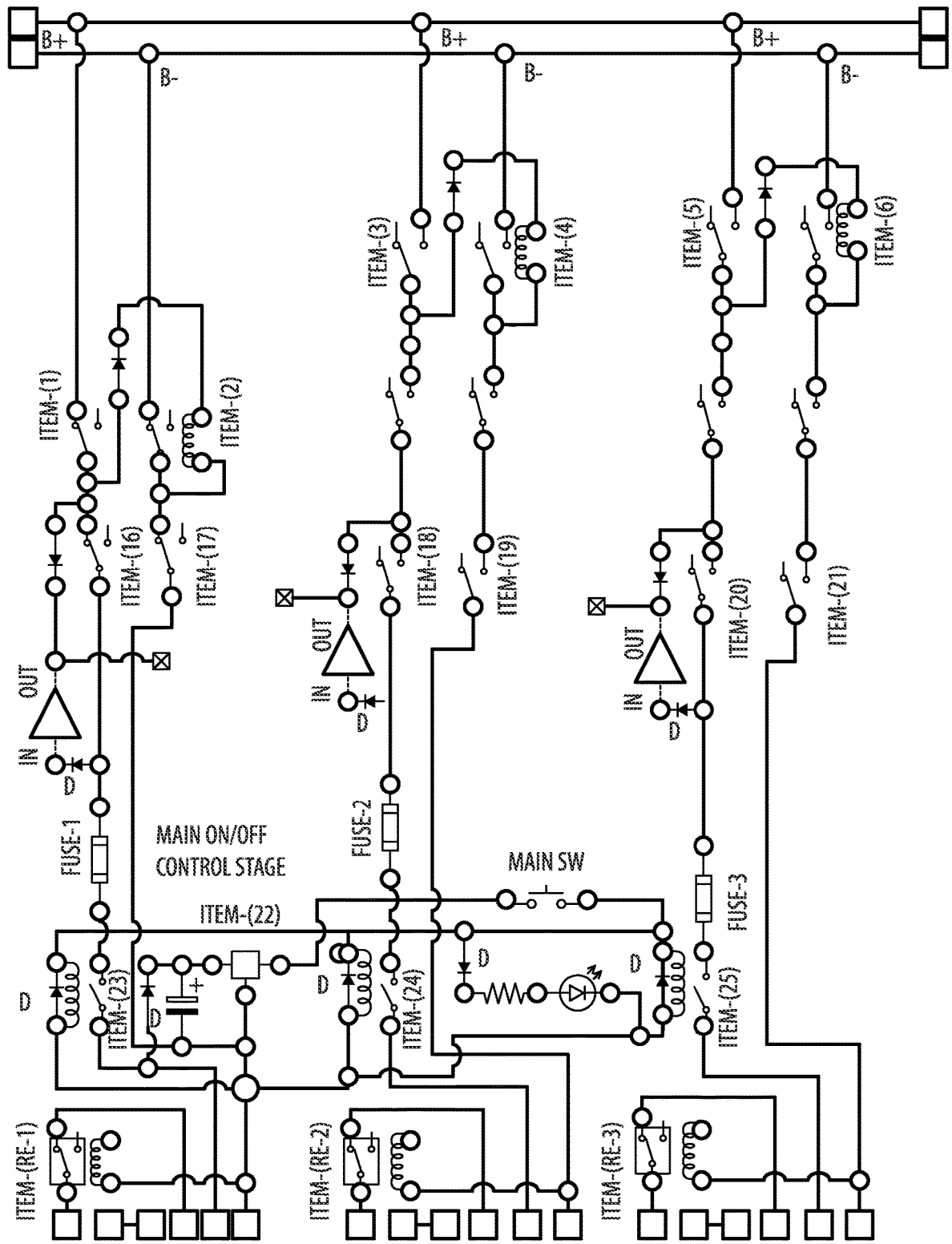
FIG. 3: Illustrates the charger enable and disable configuration, along with the Main enable and disable switch.

In relation to FIG. 2, FIG. 3 shows a more complete diagram of the main on\off switch using ITEM-(RE-23),-(RE-24),-(RE-25), has the ON\OFF switches in the circuitry.

Also visible on this figure, is the protection fuses, along with the Charger Control Relays, ITEM-(RE-1) through ITEM-(RE-3) are relays that are used in a Dual role in the circuitry. They allow output voltage to a grid. Then they are configured to function as a (Voltage Feedback Blocking) device.

Figure 4:
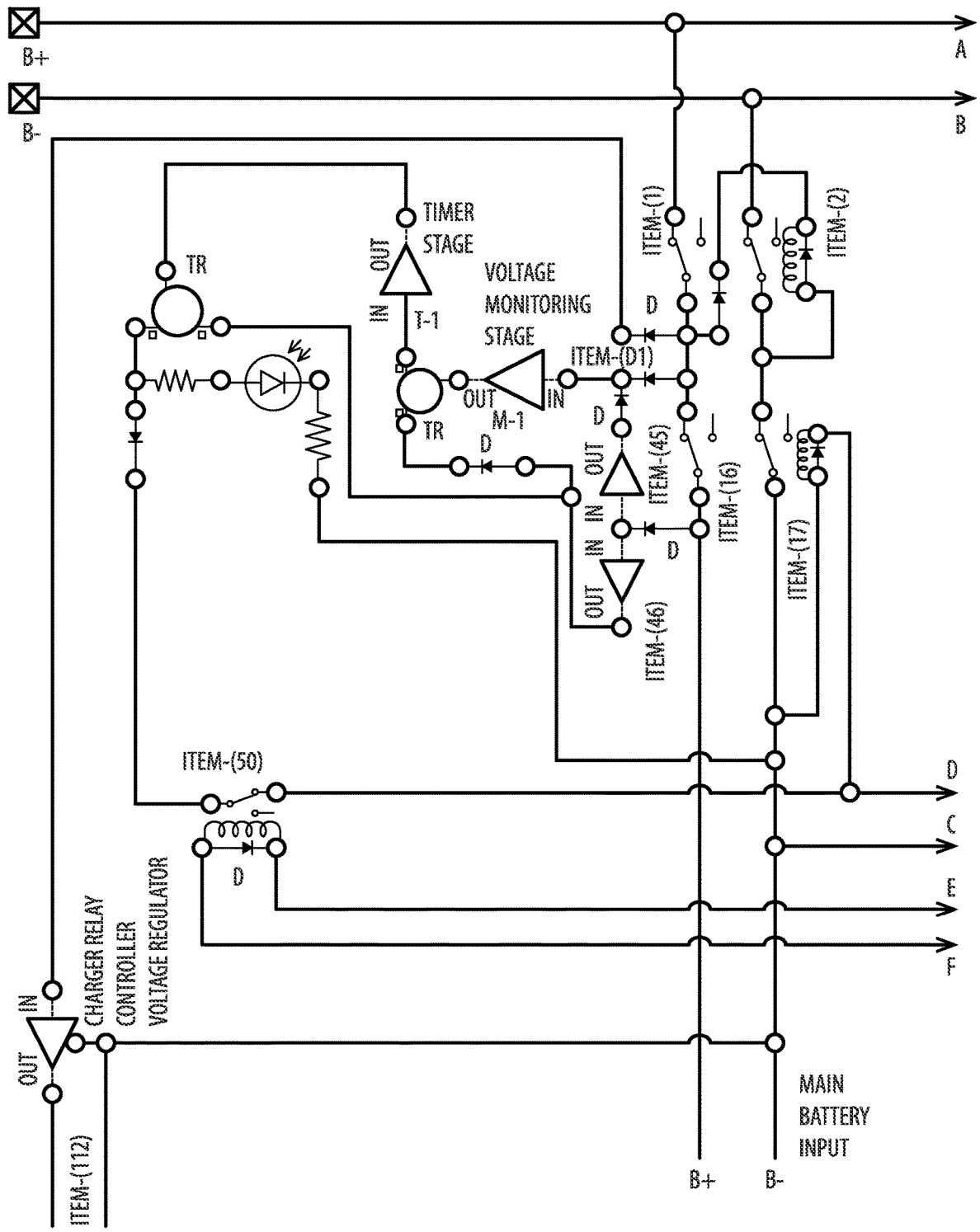
FIG. 4: Illustrates a partial diagram of the First Battery Pod.

FIG. 4 Shows a limited diagram of the first stage of the controller. The letters A, B, C, D, E, and F, are the connection point for each stages of the controller. Example, A and B would indicate the grid output connection, to the second stage FIG. 5. C and D are the command output connection, used for enabling the second stage FIG. 5. E and F receive an enable command from FIG. 6 through these connection points. Also visible on FIG. 4 is the main Battery terminal, along with Charger Relay Control Voltage connection.

Figure 5:
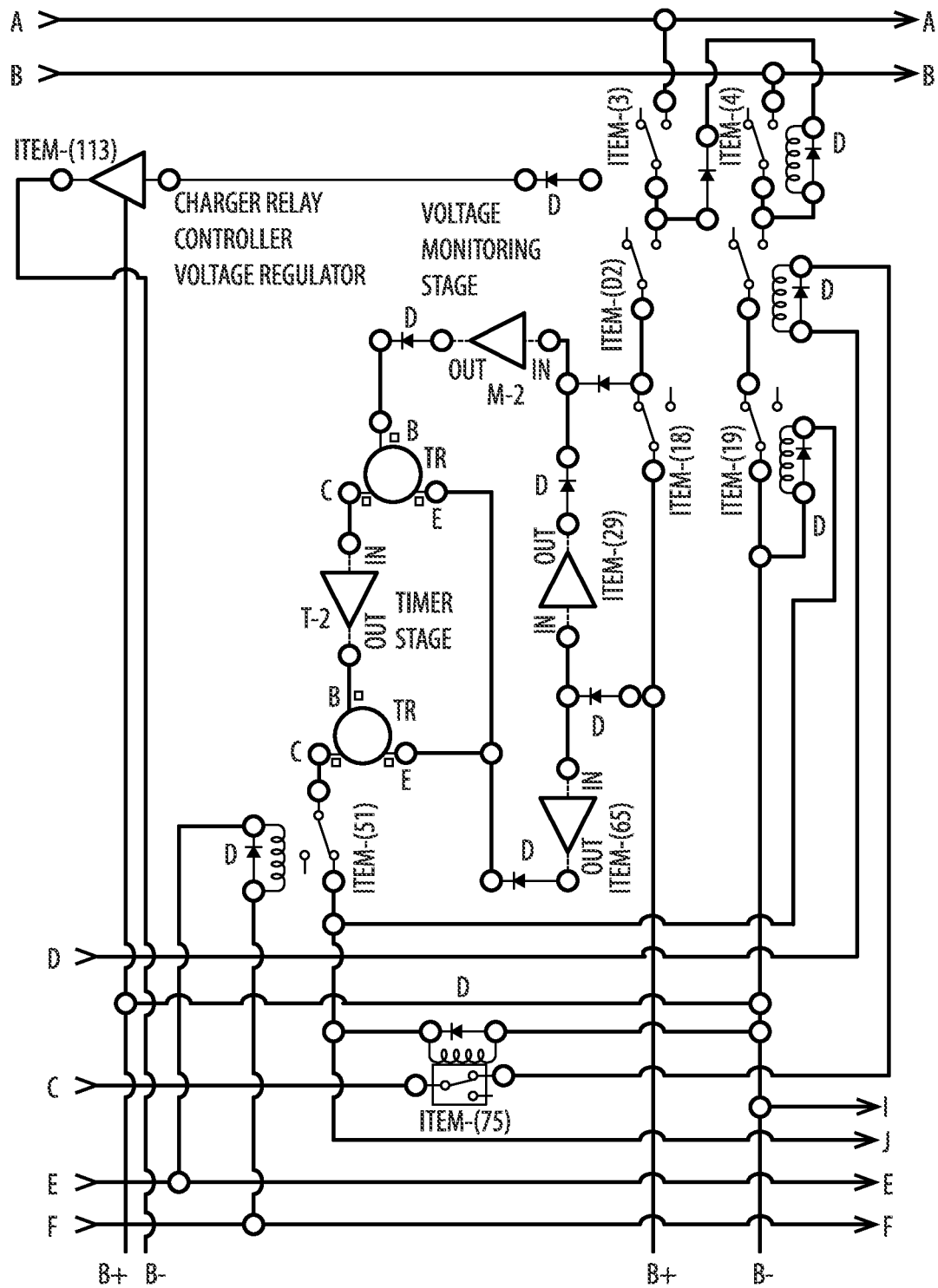
FIG. 5: Illustrates a partial diagram of the Second Battery Pod.

FIG. 5 is the second stage of a limited diagram for the controller. The letters I and J are the command connection points, for the third stage of the controller. E and F are the enabling command connection points, this command is generated from all the battery-pods. Each pod generates a command, which is used to control the next pod. When the next pod generates its command, it over-rides the first command, and the new command takes full control until a new command is generated in the next pod. And the cycle continues.

Figure 6:
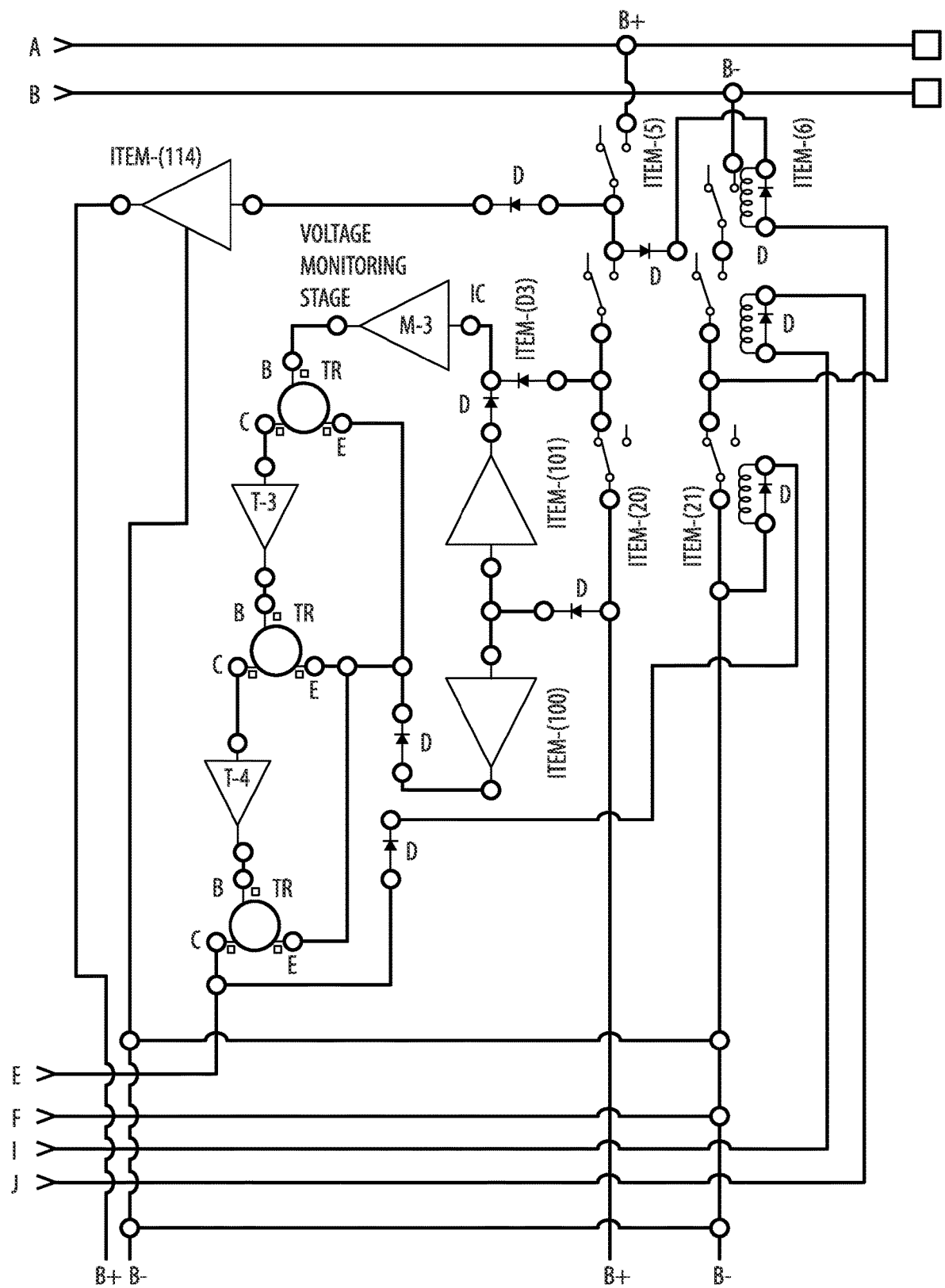
FIG. 6: Illustrates a partial diagram of the Third Battery Pod.

FIG. 6 is the final Battery-pod in a three pod configuration. It bolsters three mini-stages, with M-3 has the monitoring stage, T-3 has the first delay on timing stage, and T-4 has the second delay off timing stage. This pod generates the control command, used to reset the controller. It also ensures the charger is connected to the appropriate pods. It communicates through the letters E, F, I, and J. Regulator ITEM-(101), Diode ITEM-(D3) and Relay ITEM-(20) m along with other components, form the Monitoring and Holding voltage sensing stage. These components allow the controller to determine the differences between the output voltage, and when the unit is being charged. The other Regulator ITEM-(100) are determined, based on the voltage requirements. It should be noted that all these components can be replaced for optimum performance.

Example, the Diodes could be replaced with transistor and few resistors to switch the Base of that transistor on\off. Also, relay ITEM-(1) through ITEM-(6) could be replaced using Diodes or Transistor, tying the Base of said transistor to the input using a resistor and a zener diode.

Figure 7:
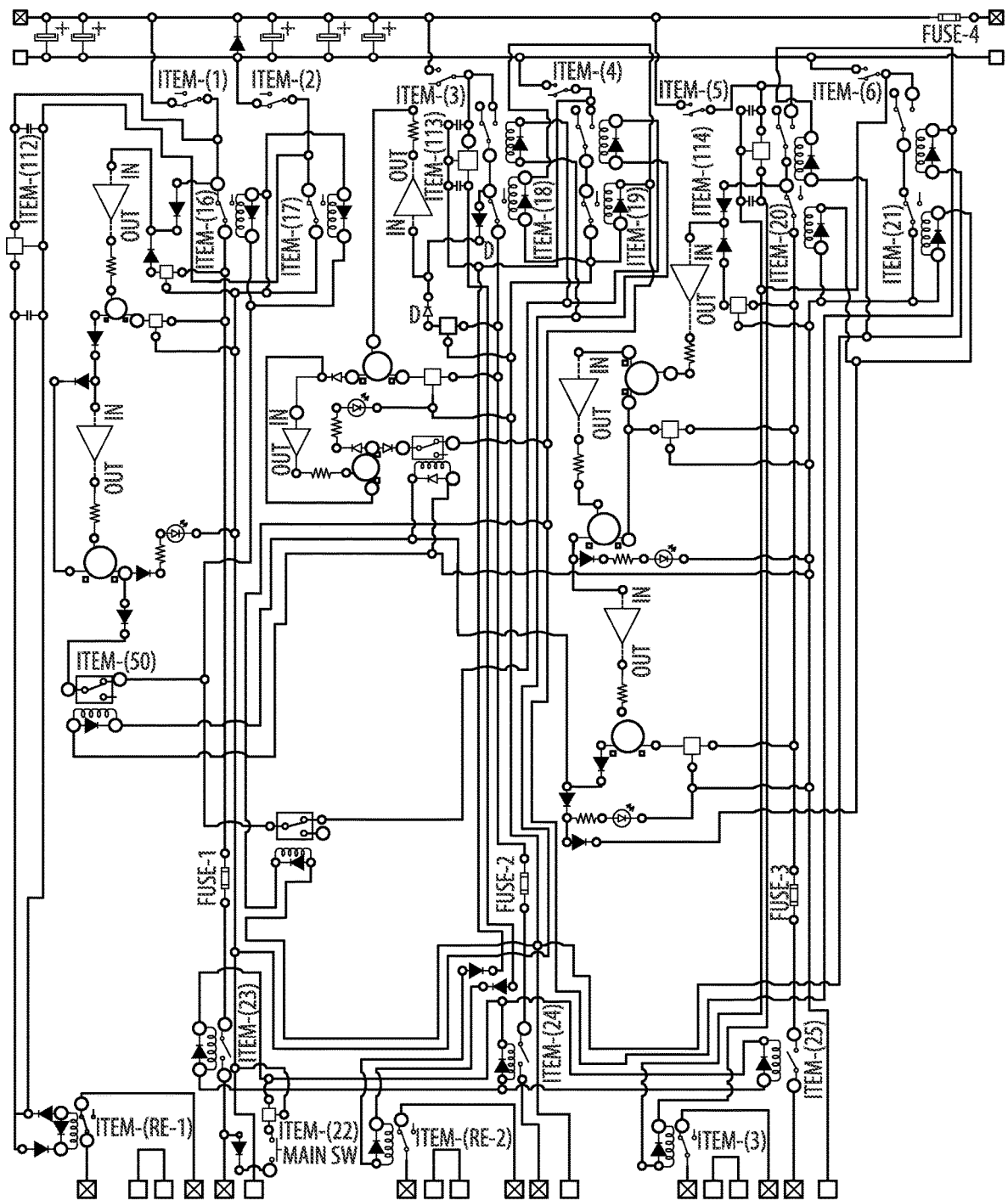
FIG. 7: Illustrates a complete diagram of the entire circuitry.

Finally, FIG. 7 shows a partial diagram of the complete circuitry. The monitoring and timing stages are incomplete. However, clearly illustrated are the three different Battery-Pod stages, marked with a box. Each pod has a total of six boxes, showing the battery and charger connection. When the Main Switch is activated, the first stage commence operation, by supplying voltage to the output grid. The second and third stages are then able to be charged and hold for a command. If there were additional Battery-pods, for example Six, Nine, or Twelve, the operational configuration would remain the same. Battery Pod-1 would supply energy to a grid, while the other battery-pods would be in a charge mode, and holding for a activation command. This command is a small electrical voltage, which is used to control the Transistors, (TR) which are visible throughout the diagram.

What is claimed is:

1. A controller comprising a minimum of three battery-pod zones;
    wherein battery pod zone-1 supplies voltage to a grid, while the remaining battery-pod zones two and three are in charge or stand-by mode;
    at the end of a first cycle, said controller is configured to change its configuration from the in charge or stand by mode settings, to battery pod-zone-1 in charge mode, battery pod zone-2 in supply mode, and battery pod zone-3 in charge mode, then said controller goes into standby mode;
    at the end of a second cycle, said controller changes its configuration, wherein battery pod zone-1 remains in charge mode, battery pod zone-2 changes from supplying mode to charging mode, and battery pod zone-3 becomes the supplying voltage zone;
    at the end of a third cycle, battery pod-1 and battery pod-2 is fully charged, then said controller continues the above sequential procedures, beginning with battery-pod zone-1.

2. The controller of claim 1 comprising a plurality of battery pod zones, wherein all the operations commence in an extending function and design.

3. The controller of claim 1, wherein the controller uses sequential control to supply voltage to a grid, while receiving a charge voltage, to maintain additional batteries in other stages.

4. The controller of claim 1, wherein the controller uses sequential control to maintain a charge in multiple batteries in multiple stages.

5. The controller of claim 1, wherein the controller uses sequential commands to communicate with other stages in a battery controller, wherein all the stages are in sync to execute a required operation, of supplying voltage to a grid and received a charge voltage to maintain batteries in multi-zones, with multi-charging operation.

6. The controller of claim 1, wherein the controller uses sequential commands, to alter its configuration, to ensure there is a continuation of supply voltage to a grid; and a constant supply of charging voltage to multiple-stage battery-pods.

7. The controller of claim 1, wherein the controller uses a sequential order, wherein low voltage regulators and relays form a low voltage, high voltage sensing stage, wherein said controller determines battery charge and discharge condition and applies the appropriate configuration.

8. The controller of claim 1, wherein the controller uses a minimum of three sub-mini stages in a zone, which control a voltage monitoring, delay on timing and switching, which controls output enabling and disabling for relays.

9. The controller of claim 1, wherein the controller uses a maximum of four sub-mini stages in a zone, which controls a voltage monitoring, delay on timing, delay off timing, and output control switching, for relays.

10. The controller of claim 1, wherein the controller uses sequential order to generate control commands, which periodically change configuration, then cancel out, and new commands are received, from new battery pod zones activation.

11. The controller of claim 1, wherein the controller uses a minimum of two sub-mini stages, which control a voltage monitoring and delay timing stage, which are used to control a electronic component in a circuitry.

12. The controller of claim 1, wherein the controller uses relays to block feedback voltage from disrupting a controller configuration.

13. The controller of claim 1, wherein the controller uses relays in a double role configuration.

14. The controller of claim 1, wherein the controller uses transistors, relays, zener diodes, regulators, and diodes to form a high and low voltage sensing stage.

15. The controller of claim 1, wherein the controller uses relays, transistor, resistors, and zener diodes to form a high and low voltage sensing stage.

16. The controller of claim 1, wherein the controller uses sequential numerical order to control a series of battery pods.

17. The controller of claim 1, wherein the controller uses sequential numerical order to control the disabling and enabling of supply voltage to a grid, while supplying a charging voltage to multiple battery-pods.

18. The controller of claim 1, wherein the controller uses delay on, delay off timing configuration.

19. The controller of claim 1, wherein the controller follows a sequential numerical order, to continuously change its configuration, and set a new configuration, based on the sequential numerical order settings received.

* * * * *